Aug. 15, 1967   R. MALITTE   3,336,076
TABLE DEVICES FOR SEATS
Filed March 28, 1966   3 Sheets-Sheet 1
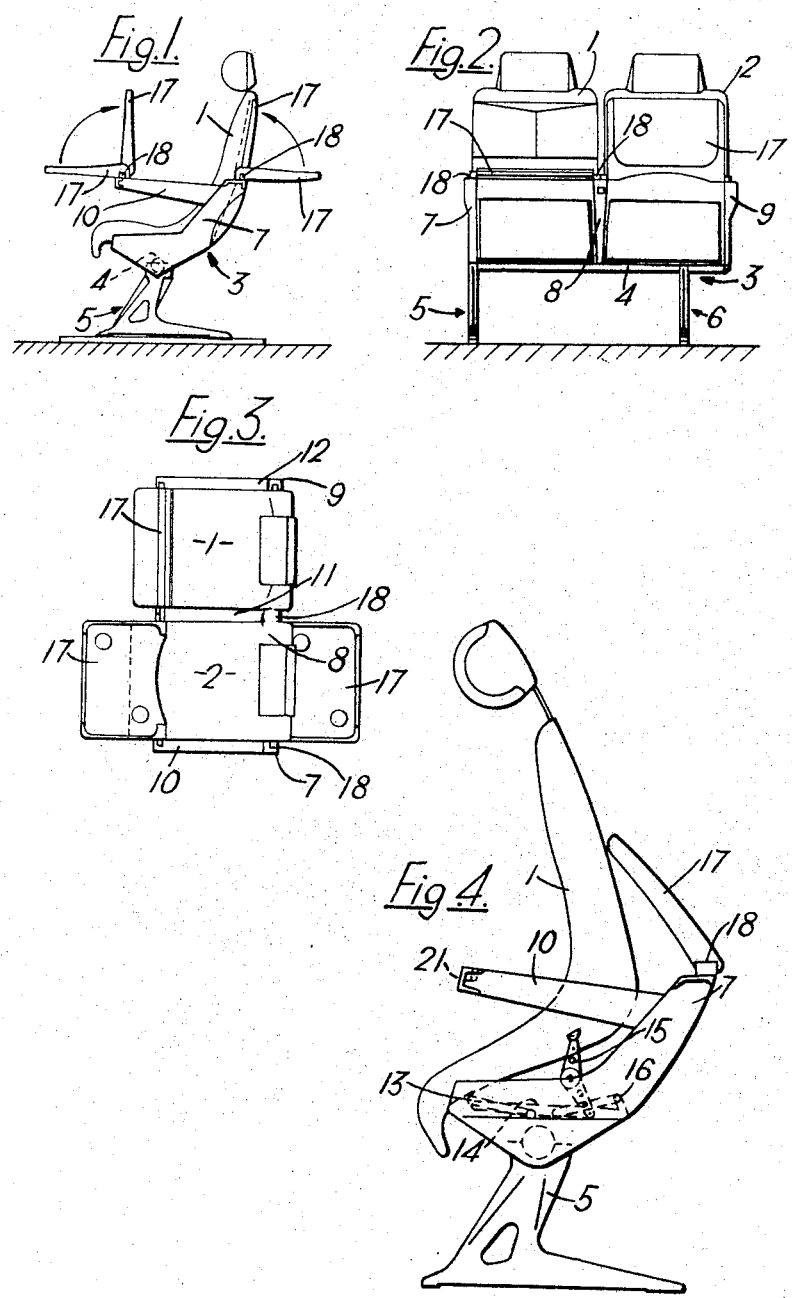
Inventor
ROBERT MALITTE
By Young & Thompson
Attorneys

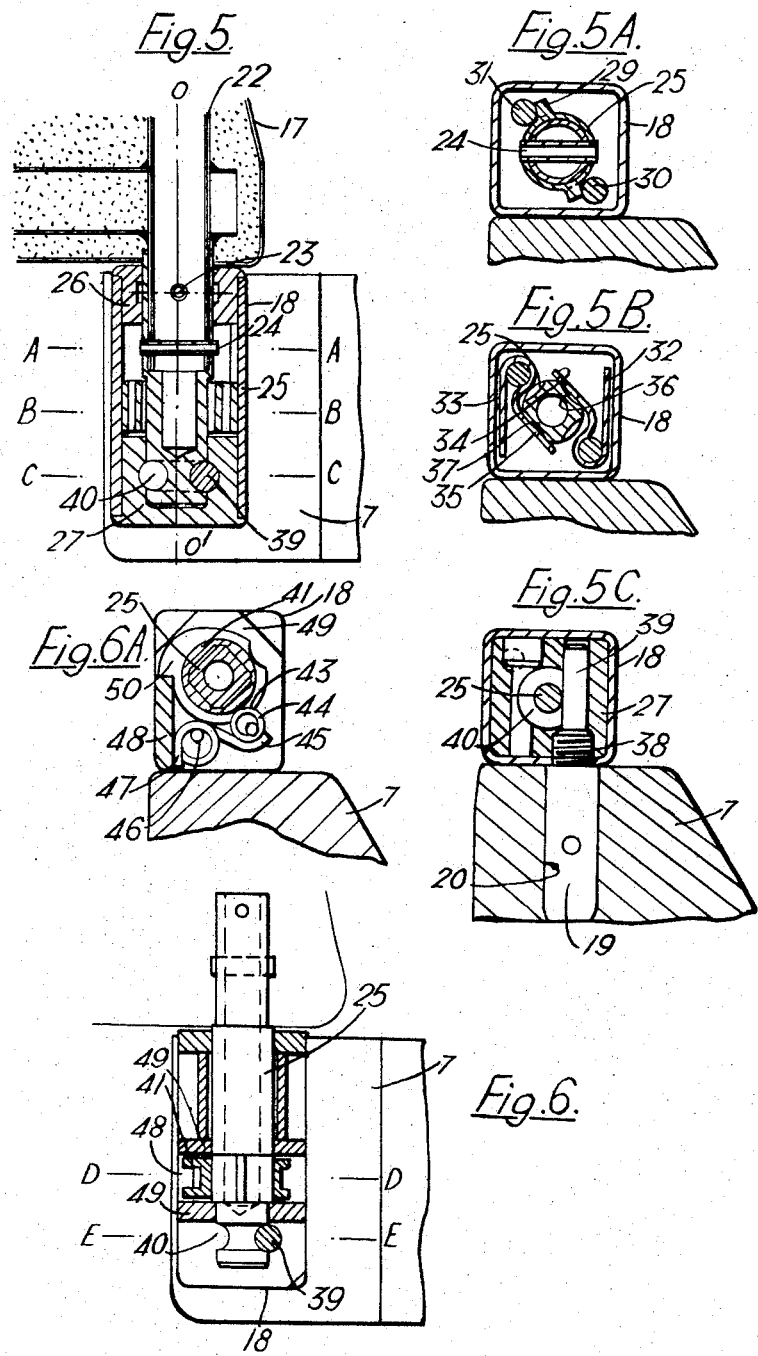

Aug. 15, 1967 R. MALITTE 3,336,076
TABLE DEVICES FOR SEATS
Filed March 28, 1966 3 Sheets-Sheet 3
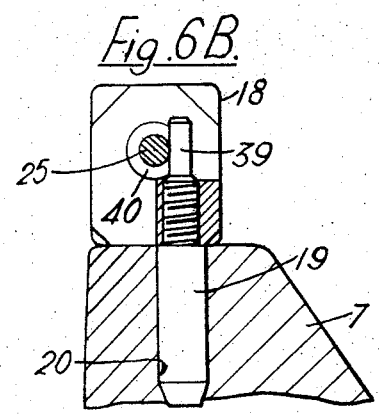
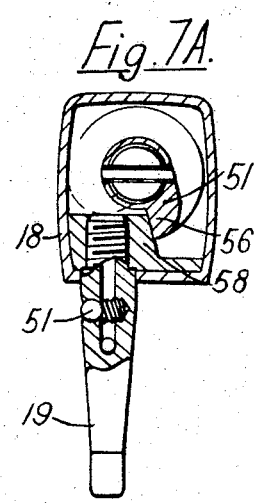
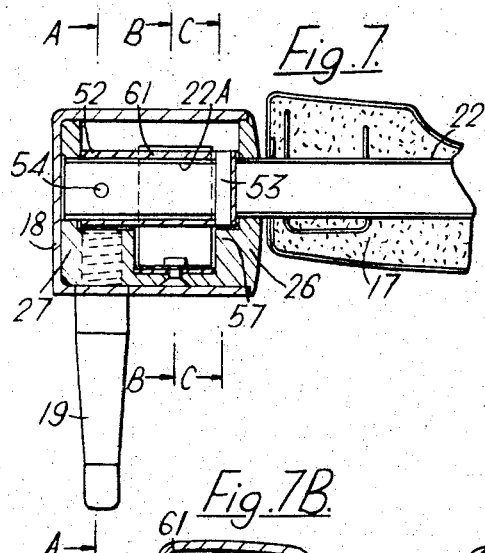
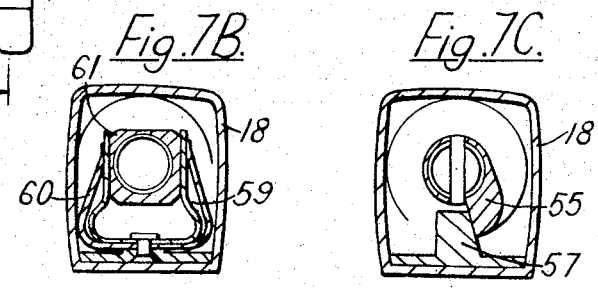
Inventor
ROBERT MALITTE
By Young + Thompson
Attorneys

United States Patent Office 3,336,076
Patented Aug. 15, 1967

3,336,076
TABLE DEVICES FOR SEATS
Robert Maliffe, Orly, France, assignor to Compagnie Nationale Air France, Paris, France, a company of France
Filed Mar. 28, 1966, Ser. No. 537,934
7 Claims. (Cl. 297—148)

ABSTRACT OF THE DISCLOSURE

For use with seats disposed one behind the other, each seat having a pair of arm rests, trays are provided which are selectively insertable in sockets at the front of the arm rests or adjacent the rear of the arm rests, so that the trays can be mounted on the front of the occupied seat, or on the rear of the seat in front of the occupied seat. The trays are swingable between horizontal use positions and vertical out-of-use positions, and yieldable detent means resist swinging movement from one position to the other.

---

The chief object of the invention is to provide a table device in which a tray is readily moved to different in-use locations.

Another object of the invention is to provide for ready movement of the tray in either in-use location to a stowed position.

Yet another object of the invention is to provide simple, compact and unobstrusive control mechanism for the hinging movement of the tray.

Other objects and advantageous features will become apparent from the embodiments now described by way of example with reference to the accompanying drawings in which:

FIG. 1 is a side view of a duplex seating unit of which several are arrangeable in a row one behind the other, e.g. in public halls and in vehicles such as passenger aeroplanes;

FIGS. 2 and 3 are respectively rear and top-plan views of the unit of FIG. 1;

FIG. 4 is a side view showing the body-receiving portion of the seating unit tilted forwards;

FIG. 5 is a sectional plan view of a pivotal mounting for the tray;

FIGS. 5A, 5B and 5C are transverse sectional views on the lines A—A, B—B and C—C of FIG. 5;

FIG. 6 is a sectional plan view of another form of pivotal mounting for the tray;

FIGS. 6A and 6B are transverse sectional views on the lines D—D and E—E of FIG. 6;

FIG. 7 is a sectional elevation of yet another form of pivotal mounting for the tray; and FIGS. 7A, 7B and 7C are transverse sectional views on the lines A—A, B—B and C—C of FIG. 7.

Referring to the drawings:

A duplex seating unit consists of a pair of side-by-side body-receiving portions 1 and 2 individually mounted on a framework 3. The framework includes a transversely extending tubular base frame 4, a pair of generally L-shaped legs 5 and 6 at opposite ends of the base frame, and three L-shaped side frames 7, 8 and 9 upstanding from the base frame and carrying the body-receiving portions 1 and 2. Three arm rests 10, 11 and 12 project forwards from the upstanding limb of the side frames. Each body-receiving portion 1, 2 is pivotally mounted at 13 on a carriage 14 for forward tilting movement which is limited by extensible linkage means 15, and each carriage 14 is mounted on a pair of the side frames 7–9 by roller-and-slot means 16 which enable angular adjustment of the body-receiving portion 1, 2 relative to the supporting framework.

Each body-receiving portion 1, 2 has associated therewith a table device which consists of a portable tray 17; a pivotal mounting therefor including a pair of axle boxes 18; a pair of pins 19 (FIGS. 5 and 5C) projecting from the respective axle boxes 18; a pair of sockets 20 formed in the tops of the respective side frames and positioned at the rear ends of the arm rests; and a pair of sockets 21 (FIG. 4) in the tops of the respective arm rests and positioned at the front ends thereof. The pins 19 are a push fit in the sockets 20, 21.

With a plurality of such seating units arranged in a row one behind the other, the tray 17 associated with each body-receiving portion can be located selectively on the arm rests by inserting the pins 19 in the sockets 21, or on the side frames of the seat in front by withdrawing the pins from the sockets 21 and inserting them in the sockets 20. By virtue of the pivotal mounting, the tray in either location can be hinged between a horizontal in-use position and an upright stowed position, as indicated by the arrows in FIG. 1. The tray when located on the arms rests of the seat is much nearer to the user of the seat (for meals or for writing) than when it is located on the rear of the seat in front.

The axle boxes 18 embody lug-and-stop devices for limiting the hinging movement of the tray, and also embody detent means for yieldingly resisting movement of the tray from its adjusted positions. In FIG. 5 the tray 17 includes a transverse tubular rod 22 on each end of which pins 23 and 24 fix a stub axle 25 which rotates in end bearing blocks 26 and 27. Lugs 28 and 29 on the stub axle 25 engage two stop rods 30 and 31 carried by the end blocks 26 and 27, and serve to support the tray 17 in the horizontal in-use position and to limit pivoting of the tray about the axis 00' to the forwardly tilted position shown in FIG. 4. Two U-type leaf springs 32 and 33 are hooked on to the stop rods 30 and 31 and the limbs 34 and 35 of the springs form spring detents which engage co-operating peripherally disposed flats 36 and 37 on the stub axle 25 to maintain the tray yieldingly in its in-use and stowed positions. The stub axle 25 terminates within the axle box 18, and the pin 19 is screwed into the bearing block 27, as shown at 38, and terminates in a shank 39 which engages in a circular groove 40 in the stub axle 25 and thereby locks the axle box on the stub axle.

In FIG. 5 a cam 41 keyed to a square-section stub axle 25 has therein two peripherally spaced indentations 42 and 43 into one or other of which a detent roller 44 is urged by a detent spring 45 anchored in the axle box by a pin 46 and a tailpiece 47 which abuts a stop plate 48 integral with spaced bearing blocks 49. Support for the tray in use is ensured by a lug 50 on the cam 41 abutting the stop plate 48. A shank 39 on the pin 19 engages in a circular groove 40 in the stub axle 25 to lock the axle box 18 on the stub axle.

In FIG. 7 each of the pins 19 by which the tray is fixed has a spring-urged rounded stop 51 for co-operation with the wall of the corresponding socket 20, 21 to retain the pin frictionally in the socket. The rod 22 in the tray forms the stub axles 22A each rotatable in the end bearing blocks 26 and 27 in the axle box 18. A sleeve 52 secured to the stub axle 22A by pins 53 and 54 has thereon a pair of lugs 55 and 56 which engage stops 57 and 58 integral with the blocks 26 and 27, to limit the hinging movement of the tray 17. A pair of rested U-springs anchored at their bases to the bottom of the axle box engage opposite faces of a square-section portion 61 of the sleeve 52 to resist yieldingly upward pivoting of the tray from its in-use position and downward pivoting of the tray from its upright stowed position.

Thus the tray 17 is capable of quick transference from one location to another in accordance with the use to which it is to be put, and is easily hinged between in-use and stowed positions in either location. Moreover, the lug-and-stop mechanism and the spring detent mechanism are of simple and compact construction and, being wholly housed in the axle boxes, are unobstrusive and so do not detract from the overall appearance of the seat.

I claim:
1. In combination, a seat for arrangement behind a similar seat and having body-receiving means, a framework supporting said means, and a pair of arm rests on the framework; a table device comprising a tray, a pivotal mounting carrying the tray to enable hinging movement thereof, a pair of laterally spaced pins on the pivotal mounting, a pair of laterally spaced sockets in the framework at the rear of the respective arm rests, and a pair of laterally spaced sockets in the respective arm rests at the front thereof, the pins on the pivotal mounting being insertible in one or other pair of sockets to locate the tray selectively on the arm rests or on the rear of the seat in front, and the tray in either location being hingeable between a horizontal in-use position and an upright stowed position.

2. In combination, a seat for arrangement behind a similar seat and having body-receiving means, a framework supporting said means, a pair of arm rests on the framework; a table device comprising a tray, a pivotal mounting carrying the tray to enable hinging adjustment thereof between a horizontal in-use position and an upright stowed position and including axle means mounted in bearing means; resiliently yieldable detent means on the bearing means; peripherally disposed formations on the axle means co-operable with the detent means to create resistance to hinging movement of the tray from either adjusted position; a pair of laterally spaced pins on the pivotal mounting; a pair of laterally spaced sockets in the framework at the rear of the respective arm rests; and a pair of laterally spaced sockets in the respective arm rests at the front thereof; the pins on the pivotal mounting being insertible in one or other pair of sockets to locate the tray selectively on the arm rests or on the rear of the seat in front.

3. The combination according to claim 2, wherein lug means on the axle means and stop means on the bearing means co-operate to limit the downward hinging movement of the tray.

4. The combination according to claim 3, wherein the seat has the body-receiving portion mounted on the supporting framework for forward tilting movement; and the table device has lug means on the axle means and stop means on the bearing means co-operable to limit forward tilting movement of the tray beyond its upright stowed position.

5. In combination, a seat for arrangement behind a similar seat and having body-receiving means, a framework supporting said means, a pair of arm rests on the framework; a table device comprising a tray, a pair of stub axles projecting from opposite sides of the tray; a pair of axle boxes housing the stub axles, bearings in the axle boxes rotatably supporting the stub axles to enable pivoting of the tray between a horizontal in-use position and an upright stowed position, lugs on the stub axles and stops in the axle boxes co-operable to prevent downward pivoting of the tray beyond its in-use position, spring-urged detents in the axle boxes and peripherally disposed formations on the stub axles co-operable to resist upward pivoting of the tray from its in-use position and downward pivoting of the tray from its upright stowed position, a pair of pins projecting from the respective axle boxes, a pair of sockets in the framework at the rear of the respective arm rests, and a pair of sockets in the respective arm rests at the front thereof the pins being insertible in one or other pair of sockets to locate the tray selectively on the arm rests or on the rear of the seat in front.

6. The combination according to claim 5, wherein the stub axles terminate within the axle boxes, and the pins project within the axle boxes and engage in peripheral grooves in the stub axles to retain the axle boxes on the stub axles.

7. The combination according to claim 5, wherein the pins have thereon laterally projecting spring-urged rounded stops for frictional engagement with the walls of the sockets so that there is frictional resistance to withdrawal of the pins from the sockets.

References Cited
UNITED STATES PATENTS

| | | | |
|---|---|---|---|
| 137,738 | 4/1873 | Trevitt | 297—150 X |
| 1,790,808 | 2/1931 | Griffith | 297—153 |
| 2,563,347 | 8/1951 | Long | 297—153 X |
| 2,887,945 | 3/1959 | Speir | 108—44 X |
| 3,123,397 | 3/1964 | Murcott | 197—150 |

DAVID I. WILLIAMOWSKY, *Primary Examiner.*
JAMES T. McCALL, *Assistant Examiner.*